US008137067B2

(12) United States Patent
Kneeland et al.

(10) Patent No.: US 8,137,067 B2
(45) Date of Patent: Mar. 20, 2012

(54) TURBINE WITH INTERRUPTED PURGE FLOW

(75) Inventors: Andrew Ray Kneeland, Simpsonville, SC (US); Kahwai Gachago Muriithi, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 706 days.

(21) Appl. No.: 12/265,155

(22) Filed: Nov. 5, 2008

(65) Prior Publication Data

US 2010/0111673 A1 May 6, 2010

(51) Int. Cl.

| | |
|---|---|
| ***B64C 11/00*** | (2006.01) |
| ***B63H 7/02*** | (2006.01) |
| ***F01D 5/08*** | (2006.01) |
| ***F03B 11/00*** | (2006.01) |
| ***B21K 3/04*** | (2006.01) |
| ***B23P 15/02*** | (2006.01) |

(52) U.S. Cl. .............. 416/96 R; 416/193 A; 416/244 A; 415/115; 29/889.7

(58) Field of Classification Search .................... 416/95, 416/96 R, 198 A, 244 A, 193 A, 248; 415/115; 29/889.7

See application file for complete search history.

(56) References Cited

U.S. PATENT DOCUMENTS

| | | | | |
|---|---|---|---|---|
| 3,597,109 | A | 8/1971 | Petrie et al. | |
| 3,817,654 | A * | 6/1974 | Sohma | 415/103 |
| 3,841,792 | A | 10/1974 | Amos | |
| 4,767,274 | A | 8/1988 | Walter | |
| 5,135,354 | A | 8/1992 | Novotny | |
| 5,281,097 | A * | 1/1994 | Wilson et al. | 416/193 A |
| 5,388,962 | A * | 2/1995 | Wygle et al. | 416/95 |
| 5,425,622 | A | 6/1995 | Murray | |
| 5,630,703 | A * | 5/1997 | Hendley et al. | 416/95 |
| 6,042,336 | A | 3/2000 | Bulgrin et al. | |
| 6,065,928 | A * | 5/2000 | Rieck et al. | 415/115 |
| 6,464,453 | B2 * | 10/2002 | Toborg et al. | 415/115 |
| 7,003,956 | B2 * | 2/2006 | Yamashita et al. | 60/646 |
| RE39,630 | E | 5/2007 | Stangeland et al. | |
| 7,322,797 | B2 * | 1/2008 | Lee et al. | 416/193 A |
| 7,374,400 | B2 * | 5/2008 | Boswell | 416/97 R |
| 7,976,281 | B2 * | 7/2011 | Keith et al. | 416/193 A |
| 2005/0175461 | A1 | 8/2005 | Lagrange et al. | |
| 2006/0005546 | A1 * | 1/2006 | Orlando et al. | 60/782 |
| 2006/0013690 | A1 * | 1/2006 | Athans et al. | 416/193 A |

* cited by examiner

*Primary Examiner* — Barbara Summons
(74) *Attorney, Agent, or Firm* — Cantor Colburn LLP

(57) ABSTRACT

A blade attachment apparatus for a turbine is provided and includes a member, which rotates about an axis of the turbine, including fore and aft disk posts that retain corresponding fore and aft turbine blades, respectively, fore and aft of a turbine nozzle and a central portion proximate the turbine nozzle and an attachment retained between the fore and aft disk posts and the fore and aft turbine blades and coupled to the central portion, such that a portion of the attachment interrupts a purge flow through the turbine.

18 Claims, 2 Drawing Sheets

TURBINE WITH INTERRUPTED PURGE FLOW

BACKGROUND OF THE INVENTION

Aspects of the invention are directed to turbines and, more particularly, to turbines with an interrupted purge flow.

Generally, cooling air is employed to purge and cool cavities defined between rotating and static stages of turbines, such as gas turbines. For a gas turbine, the cooling air is book kept as a cycle penalty against the overall efficiency of the gas turbine as this air bypasses the turbine and combustor so that no work can be extracted from it.

Typically, the flow of the cooling air is governed by a diaphragm installed between rotating turbine stages. As such, associated nozzles include a static platform and pieces having knife-like edges.

BRIEF DESCRIPTION OF THE INVENTION

According to one aspect of the invention, a blade attachment apparatus for a turbine is provided and includes a member, which rotates about an axis of the turbine, including fore and aft disk posts that retain corresponding fore and aft turbine blades, respectively, fore and aft of a turbine nozzle and a central portion proximate the turbine nozzle and an attachment retained between the fore and aft disk posts and the fore and aft turbine blades and coupled to the central portion, such that a portion of the attachment interrupts a purge flow through the turbine.

According to another aspect of the invention, a method of assembling a blade attachment apparatus for a turbine is provided and includes forming a member, for rotation about an axis of the turbine, the member including fore and aft disk posts and a central portion interposed therebetween, installing fore and aft turbine blades into the fore and aft disk posts, respectively, such that when the member is installed within the turbine, the turbine blades are positioned fore and aft of a turbine nozzle and the central portion, and inserting an attachment to be retained between the fore and aft disk posts and the fore and aft turbine blades for interruption by a portion of the attachment of a purge flow through the turbine during operations thereof

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, a turbine, such as a gas turbine, is provided and includes a casting of two blades (i.e., airfoils) and an attachment, such as a rotating platform. When the casting and the attachment are installed into the axial, angled and/or curved dovetail slot of the turbine, a sealed cavity is formed. The seal pins between the blades will be centrifugally loaded against the blades to thereby seal leaks between the blades. The dovetail will hold the blades and the attachment in place relative to an axis of a rotor of the turbine. The casting and the attachment can be single pieces or divided into two or more pieces to decrease manufacturing costs. In these cases, the divided castings and attachments can be welded or bonded together.

With this construction, it is seen that a cantilevered nozzle that is set next to the attachment will require less cooling air. Also, purge air will not be required for purge cavities defined in the casting. As such, a total flow quantity of purge air can be reduced and used strictly for cooling the blades and the attachment and to thereby improve turbine performance.

Figure 1:
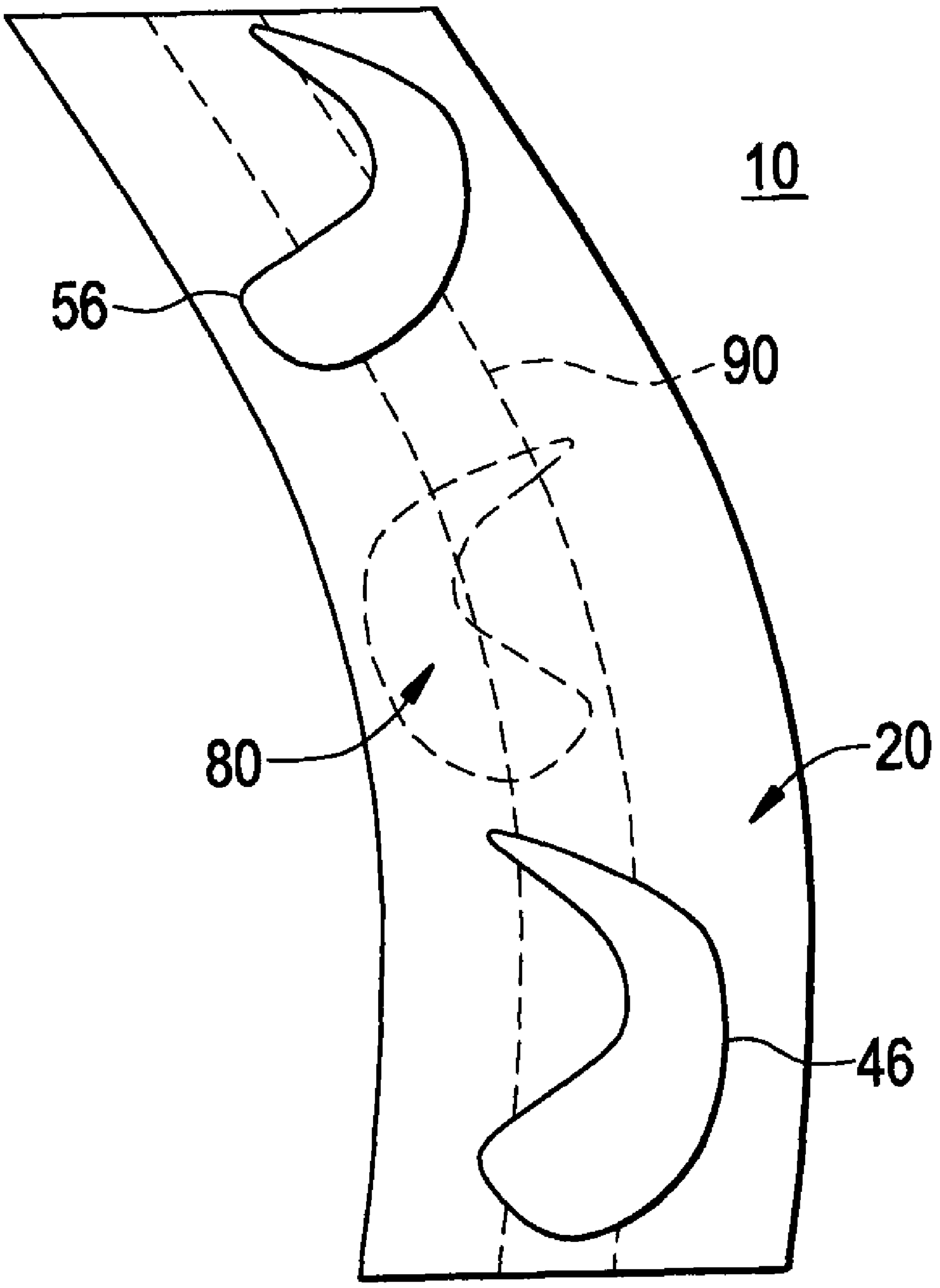
FIG. 1 is a top view of a portion of a turbine.
Figure 2:
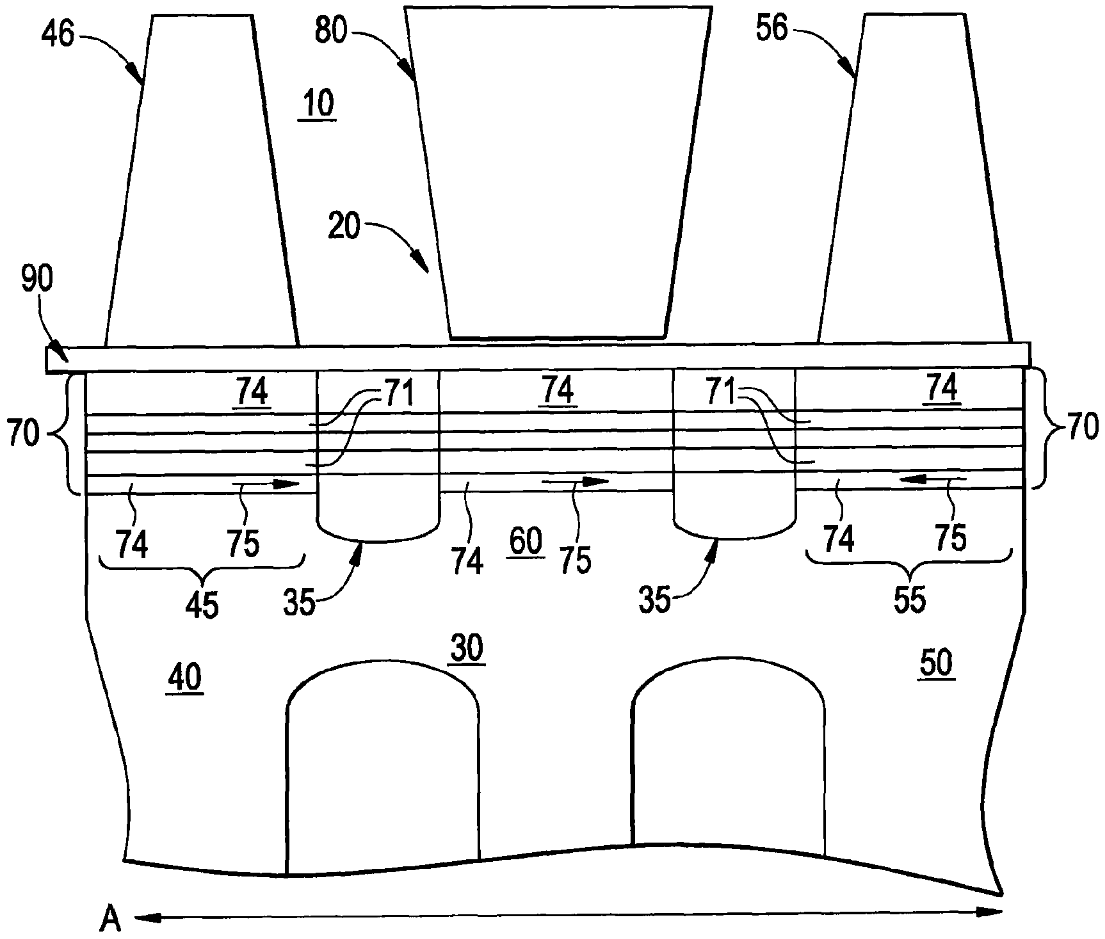
FIG. 2 is a side view of the portion of the turbine of FIG. 1.

With reference to FIGS. 1 and 2, a blade attachment apparatus 20 for a turbine 10 is provided and includes a member, such as a casting 30, which rotates about an axis A of the turbine 10, and an attachment 90. Herein, although the member is shown as a casting 30, it is understood that the member could be formed by various methods and need not be cast to achieve a similar effect. The casting 30 is generally formed with a fore portion 40, an aft portion 50 and a central portion 60. The fore portion and the aft portions 40 and 50 each resemble rotation disks and the central portion 60 connects them together. The casting 30 is further formed with purge cavities 35 defined aft of the fore portion 40 and fore of the aft portion 50.

The fore and aft portions 40 and 50 of the casting 30 each further include fore and aft disk posts 45 and 55 that retain corresponding fore and aft turbine blades 46 and 56, respectively. The retention is achieved by the interaction of fir-tree attachments 70 of each of the disk posts 45 and 55 and corresponding surfaces 71 of the turbine blades 46 and 56 in which friction between abutting surfaces is generated during the rotation of the casting 30 and the turbine blades 46 and 56. With this configuration, spaces 74, which are formed between ends of the fir-tree attachments 70 and the casting 30, define cooling paths 75 through which coolant flows to and/or from the purge cavities 35

The attachment 90 is inserted between the fore and aft disk posts 45 and 55 and the fore and aft turbine blades 46 and 56. During the rotation of the casting 30 within the turbine 10, the attachment 90 is held in place by the retention of the turbine blades 46 and 56 by the disk posts 45 and 55 as well as mechanical fasteners that couple the attachment to, e.g., the central portion 60. The attachment 90 is therefore positioned to interrupt a purge flow to the purge cavities 35 and to additionally divert airflow back to and/or within the cooling paths 75 and toward, e.g., the central portion 60 of the casting 30.

The casting 30 is installed within the turbine 10 such that the fore and aft turbine blades 46 and 56, when retained as described above, are positioned fore and aft of a turbine nozzle 80 which is proximate the central portion 60 of the casting 30. The turbine nozzle 80 may, in an embodiment, be stationary within the turbine 10. In either case, the turbine nozzle 80 is cantilevered to a turbine shroud or some other suitable structure that generally defines an outer circumference of the turbine 10 and extends inward within the turbine 10 toward but without contacting the central portion 60.

In accordance with embodiments of the invention, since the attachment 90 interrupts purge flow to the purge cavities 35, the attachment 90 allows for a decrease in an amount of air that must be removed for the purge flow from the total quantity of inlet air to the turbine 10. Also, an increased or relatively large portion of whatever air that is removed from the inlet air can be diverted to the cooling paths 75 for use as coolant. Here, since the attachment 90 further serves to divert airflow within the cooling paths 75, the attachment 90 further allows for the cooling airflow to be shared by the fore and aft disk posts 45 and 55 and the central portion 60.

In accordance with further embodiments of the invention, the casting 30 and the attachment 90 may each be formed of single parts. Alternately, where it is required by machining tolerances, the casting 30 and the attachment 90 may also be formed of separate parts that are welded together at respective midpoints thereof That is, the casting 30 and/or the attachment 90 may be welded proximate to a central axial position of the central portion 60.

The casting 30 and the attachment 90 can be respectively installed in any straight, angled or curved portion of the turbine 10 including, e.g., the dovetail section thereof, as shown in FIG. 1. In this case, the casting 30 and the attachment 90 are formed with a curvature that mimics the curvature of the turbine 10. In this way, the turbine blades 46 and 56 and the turbine nozzle 80 are offset from one another such that vibratory moments within the turbine 10 are prevented or substantially decreased.

In accordance with another aspect of the invention, a method of assembling a blade attachment apparatus for a turbine 10 is provided. The method includes forming a casting 30, for rotation about an axis A of the turbine 10. Here, as described above, the casting 30 includes fore and aft disk posts 45 and 55 and a central portion 60 interposed therebetween. The method further includes installing fore and aft turbine blades 46 and 56 into the fore and aft disk posts, respectively, such that when the casting 30 is installed within the turbine 10, the turbine blades 46 and 56 are positioned fore and aft of a turbine nozzle 80 and the central portion 60. Finally, the method includes inserting an attachment 90 to be retained between the fore and aft disk posts 45 and 55 and the fore and aft turbine blades 46 and 56 for interruption of a purge flow through the turbine 10 during operations thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A blade attachment apparatus for a turbine, comprising:

a member, which rotates about an axis of the turbine, including fore and aft disk posts that retain corresponding fore and aft turbine blades, respectively, fore and aft of a turbine nozzle and a central portion proximate the turbine nozzle; and an attachment retained between the fore disk post and the fore turbine blade and between the aft disk post and the aft turbine blades and coupled to the central portion, such that a portion of the attachment interrupts a purge flow through the turbine.

2. The blade attachment apparatus according to claim 1, wherein the member defines purge cavities aft and fore of the fore and aft turbine blades, respectively, to which the purge flow is interrupted.

3. The blade attachment apparatus according to claim 1, wherein cooling flows are shared by the fore and aft disk posts and the central portion.

4. The blade attachment apparatus according to claim 3, wherein the attachment retains the cooling flows for the fore and aft disk posts and the central portion.

5. The blade attachment apparatus according to claim 1, wherein the attachment comprises a single member.

6. The blade attachment apparatus according to claim 1, wherein the attachment comprises two half members coupled to one another at a position proximate a midpoint of the central portion.

7. The blade attachment apparatus according to claim 1, wherein the member comprises a single member.

8. The blade attachment apparatus according to claim 1, wherein the member comprises two half members coupled to one another at a position proximate a midpoint of the central portion.

9. The blade attachment apparatus according to claim 1, wherein the member and the attachment are at least one of curved and angled with respect to the axis of the turbine.

10. The blade attachment apparatus according to claim 1, wherein the fore and aft turbine blades and the turbine nozzle are offset from one another.

11. A method of assembling a blade attachment apparatus for a turbine, the method comprising:

forming a member, for rotation about an axis of the turbine, the member including fore and aft disk posts and a central portion interposed therebetween;

installing fore and aft turbine blades into the fore and aft disk posts, respectively, such that when the member is installed within the turbine, the turbine blades are positioned fore and aft of a turbine nozzle and the central portion; and inserting an attachment to be retained between the fore disk post and the fore turbine blade and between the aft disk post and the aft turbine blades for interruption by a portion of the attachment of a purge flow through the turbine during operations thereof.

12. The method according to claim 11, further comprising casting the member.

13. The method according to claim 11, further comprising forming the member as a single piece.

14. The method according to claim 11, further comprising forming the member in multiple pieces and attaching the multiple pieces to one another at the central portion.

15. The method according to claim 11, further comprising forming the attachment as a single piece.

16. The method according to claim 11, further comprising forming the attachment in multiple pieces and attaching the multiple pieces to one another proximate the central portion of the member.

17. The method according to claim 16, wherein the attaching precedes the inserting.

18. The method according to claim 16, wherein the attaching is subsequent to the inserting.

* * * * *